United States Patent [19]

Reed, Sr.

[11] 4,292,543

[45] Sep. 29, 1981

[54] ELECTRICAL ENERGY MANAGEMENT DEVICES

[76] Inventor: Jerry K. Reed, Sr., 17 Maple St., Speed, Ind. 47172

[21] Appl. No.: 77,586

[22] Filed: Sep. 21, 1979

[51] Int. Cl.³ .................. H02H 1/06; H02H 3/06; H02H 3/24

[52] U.S. Cl. .................. 307/35; 307/39; 307/126

[58] Field of Search .................. 307/35, 38, 39, 41, 307/126, 130; 364/492, 120; 323/2, 3

[56] References Cited

U.S. PATENT DOCUMENTS

| 4,177,388 | 12/1979 | Lingenfelter | 307/39 |
| 4,180,744 | 12/1979 | Helwig | 307/35 |
| 4,189,776 | 2/1979 | Kendall | 307/41 |

Primary Examiner—L. T. Hix
Assistant Examiner—Stafford D. Schreyer
Attorney, Agent, or Firm—Edward M. Steutermann

[57] ABSTRACT

Method and apparatus for minimizing the peak load usage in electrical systems having multiple electrical power loads when each load is provided electrical power from an electrical source and including first switch means disposed in the power supply to each individual load, operator means to selectively open and close the first switch means, control means to selectively control the operator means, real time clock means to supply real time to the control means where the control means is adapted to actuate and deactuate each operator means at a preselected time to correspondingly open and close the first switch means associated with the operator means where the control means prevents simultaneous actuation of more than one operator means within a selected time interval, power outage detector means in cooperative association with the power source means to detect a power interruption at the power source means, second control means actuated upon resumption of power after interruption including input means, where the second control means is actuated by the power interruption and is adapted to override the first control means to sequentially reactivate the first switch means and load means which are to be in active condition at the real time of power resumption and where such reactivation occurs at a selected time interval and in selected time interval and in selected sequence, and return control from the second control means to the first control means upon resumption of power to all selected load means.

1 Claim, 4 Drawing Figures

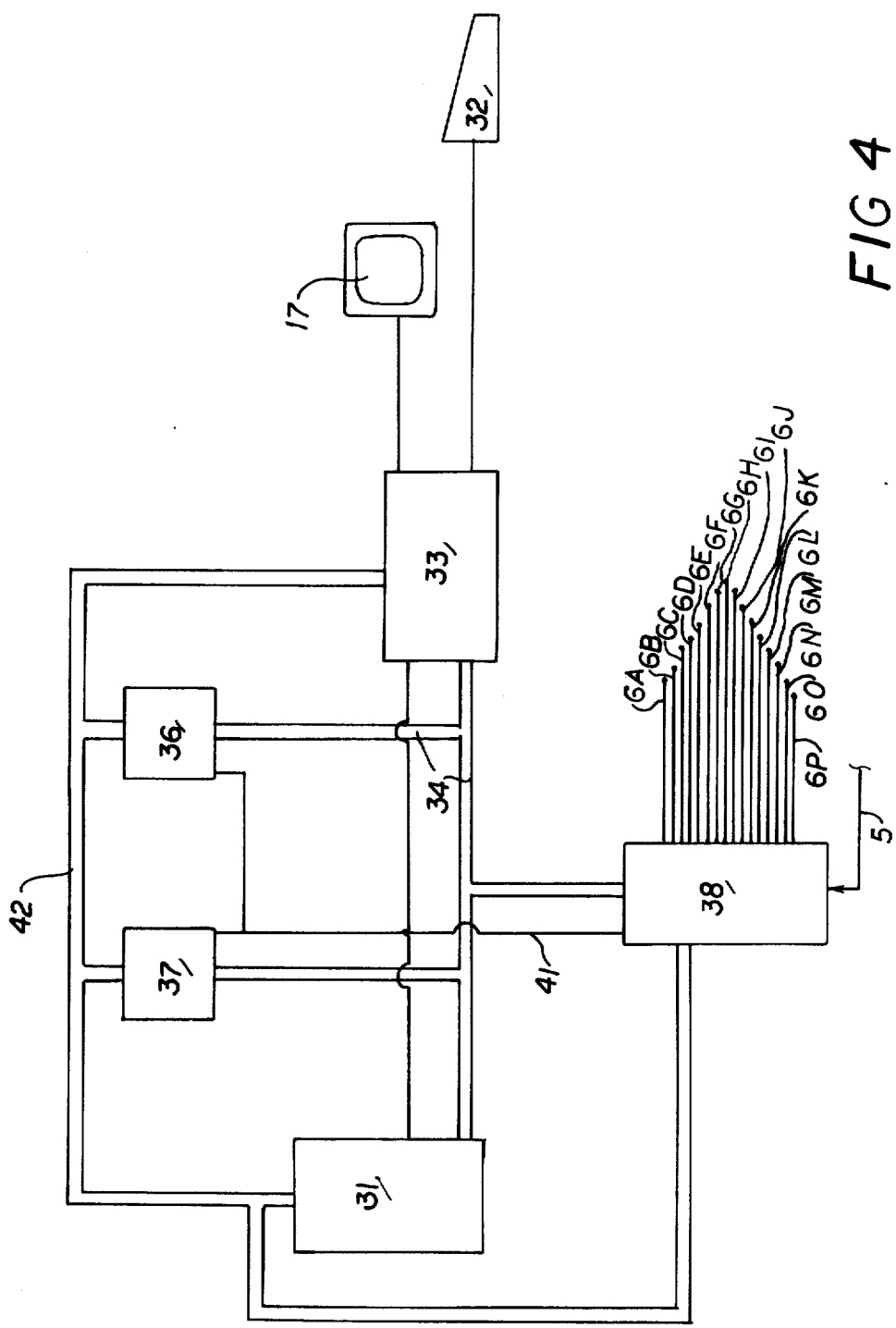

ELECTRICAL ENERGY MANAGEMENT DEVICES

BACKGROUND OF THE INVENTION

Various commercial and industrial facilities such as hospitals, hotels, motels, factories, and office buildings generally include equipment which use substantial amounts of electrical power such as in the case of hotels or motels; air handling units, ovens swimming pool heaters, lighting facilities, compressors and heating means. Other and like facilities are provided for other commercial and industrial manufacturing facilities.

It is well known that the simultaneous initiation of operation of two or more such devices rapidly increases the overall electrical power requirement of such a facility for the period of time necessary to bring the particular devices being actuated up to operating speed or to the desired temperatures as the case may be.

With the advent of the energy shortage, and even before, electrical utilities have required such users to purchase electrical power at one rate for the average or normal load and pay a penalty for the occurrence of incidences of power consumption above the average, for example the simultaneous activation of two uses. With the advent of energy shortages the penalities for such peak usage have increased rapidly and in most cases represent a substantial portion of the utilities expense of facilities which use significant amounts of electrical power.

Heretofore various devices and methods have been developed to minimize the use of electrical energy. However, such efforts have generally been directed toward reducing the overall normal load consumption by such facilities through the use of more efficient distribution of power, modulation of cooling and heating media provided by such devices, increase in the time rate rise of consumption during the initiation of devices discussed hereinbefore and the development of more efficient monitoring and control systems for the utilization of electrical power.

SUMMARY OF THE INVENTION

The present invention provides a method and apparatus to reduce electrical utilities expense for users of substantial amounts of electrical energy.

More particularly, the present invention provides a method and apparatus for the reduction of the cost of electrical utilities services by minimizing peak loading through the staged and controlled initiation of operation of devices which consume significant quantities of electrical energy during start up periods such as motors, compressors, heating systems, air handling units, and large scale lighting provided by the present invention further effects such reduction without the use of modulation control devices which directly affect the operation of such devices or the rise time of the power input to the devices upon starting.

Moreover, the present invention provides an extemely economical arrangement to reduce electrical utilities cost for major electrical consumers in a straightforward manner and at a relatively inexpensive cost so that the cost of the device is recooped quickly through reduction in electrical utility cost occasioned by penalty assessed for peak power usage.

More specifically, the present invention provides method and apparatus for minimizing the peak load usage in electrical systems having multiple electrical power loads each provided electrical power from an electrical source and including first switch means disposed in the power supply to selected individual loads, operator means to selectively open and close the first switch means, control means to selectively control the operator means, real time clock means to provide real time to the control means where the control means is adapted to actuate and deactuate each operator means at a preselected time to correspondingly open and close the first switch means associated with the operator means, where the control means prevents simultaneous actuation of more than one operator means within a selected time interval, power outage detector means in cooperative association with the power source means to detect a power interruption at the power source means, second control means actuated upon resumption of power after interruption including input means from the power outage detector means and signal output means, where the second control means is actuated by the power interruption and is adapted to override the first control means to sequentially reactivate the first switch means and load means which are to be in active condition at the real time of power resumption and where such reactivation occurs at a selected time interval and in selected sequence, and return control from the second control means to the first control means upon resumption of power to all selected load means.

One example of an arrangement within the scope of the present invention is described with respect to the accompanying figures but it is to be recognized that the illustration hereinafter is by way of example only and not by way of limitation in that other arrangements within the scope of the present invention will occur to those skilled in the art upon reading the disclosure set forth hereinafter.

BRIEF DESCRIPTION OF THE DRAWINGS

One example of the present invention is shown in the accompanying figures wherein:

FIG. 4 is a schematic diagram of the control means shown in FIG. 1.

Referring now to FIG. 1 which schematiclly illustrates an arrangement within the scope of the present invention, a power source 1 is shown, for example 120 volt AC power source. It will be recognized that within the scope of the present invention devices can be provided for use with 220 volt power service but for purposes of simplicity the example of the present invention shown in FIG. 1, is illustated with respect to 110 volt power source. The power souce 1 is connected to an interruption detector 2, for example a frequency monitor so that upon interruption of power a signal is provided at output 5 to control 12 as described hereinafter. Power source 1 is connected to parallel load circuit 3A-3P each with a 4A-4P which can represent a different power consumption device for example in the case of a motel; a pool heater, an air condition compressor, air handling units, kitchen ovens, parking light circuit, and other uses.

Figure 1:
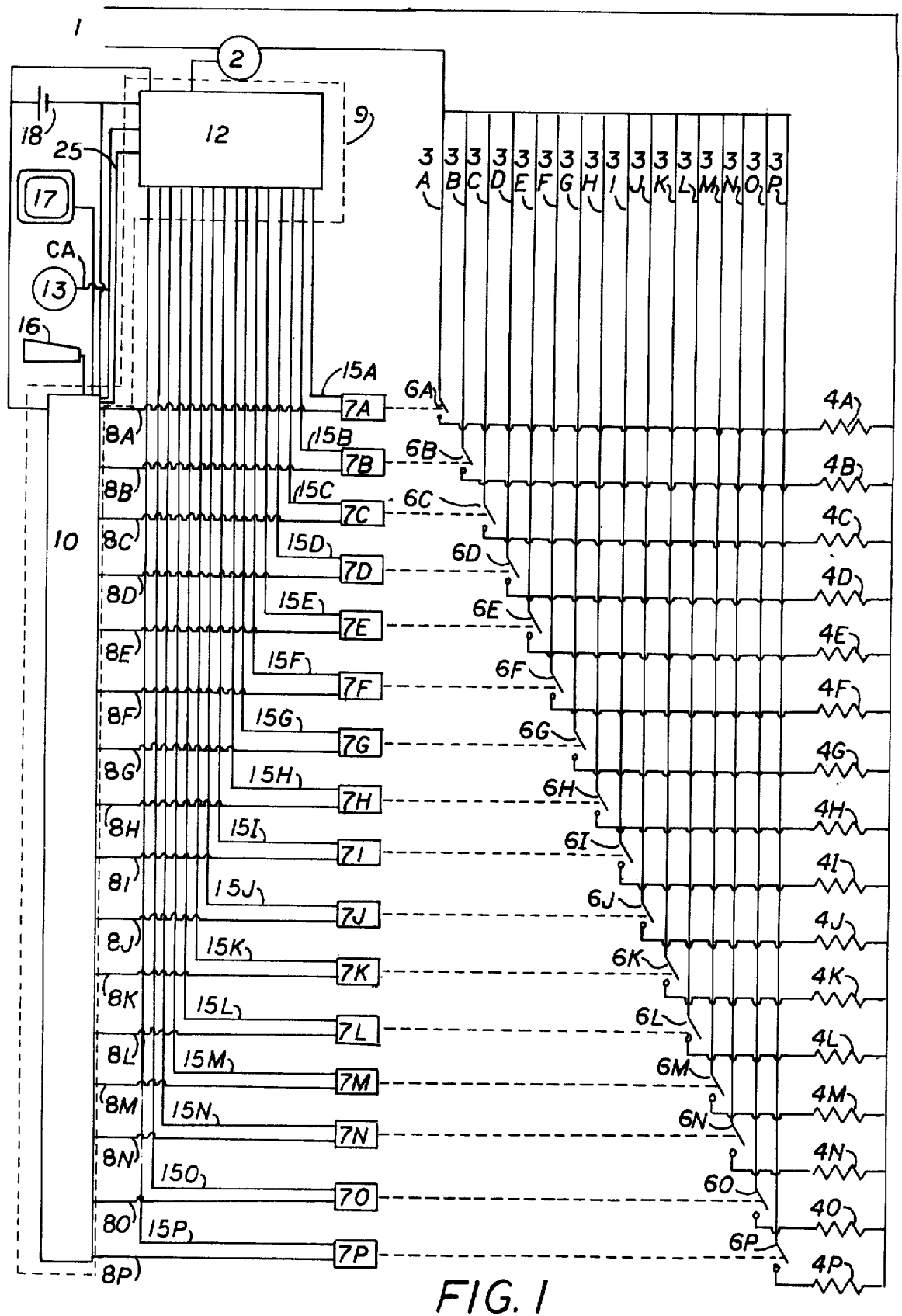
FIG. 1 is a schematic block diagram of one arrangement within the scope of the present invention.

In each case the one lead A-P of each load is connected to a switch 6A-6P. For example a low voltage normally open relay control switch as is known in the art.

Each relay 6A-6P is operated by an actuator 7A-7P which is actuated in response to output 8A-8P of a controller 9, for example Dynabyte Z 80 Base self contained control computer.

The computer functions are shown within the dotted lines encompassing computer 9 and within the computer is a basic control 10 and an override control 12. The innerconnection between the elements are simulated but it will be recognized that the specific elements can generally be included within the computer itself. Specifically, the controller 10, provides outputs 8A-8P to actuate actuators 7A-7P which operate relays 6A-6P. Controller 10 is programed based on a real time clock 13 to sequentially and selectively inititate the operation of loads 4A-4P by closing switches 6A-6P at selected periods of time and opening the switches at termination of the preselected service period of the particular load. Controller 10 is programed by means of a keyboard terminal 16 where a readout cathode ray tube 17 can be provided for operator convenience.

Within the scope of the present invention real time clock 13 and computer 9 are provided with an alternate source of power 18 for example a battery connected to controller 10 and override controller 12 described herinafter by means of lead CA initiated by the power interrupter detector 2 so that real time clock 13 maintains control of the operation of the device and normal operating sequence regardless of the status of the power to the loads 4A-4P and particularly during the occurance of the power outage. During such power outage control of the actuators 7A-7P is transfered to override controller 12 which monitors the real time and holds the proper status of each of the loads at the then real time in memory even though the loads are not actuated. Thus the function of controller 10 is tranferred to override control 12 during the period of the outage. Override control 12 has outputs 15A-15P to actuators 7A-7P and which upon resumption of power reactuate each of the actuators 7A-7P, which are to be regularly in actuated condition at the particular time of power resumption and in preselected sequence until all the relay switches 6A-6P, which should be closed at the particular time have been closed at which time control is then transfered back to controller 10 by means of lead 25.

Controller 10 is programed such that time blocks are provided to prevent the simultaneous actuation of any two load 4A-4B within a selected time interval, for example one minute, to permit a newly initiated load to achieve normal rate of power consumption prior to initiation of a second load.

Figure 2:
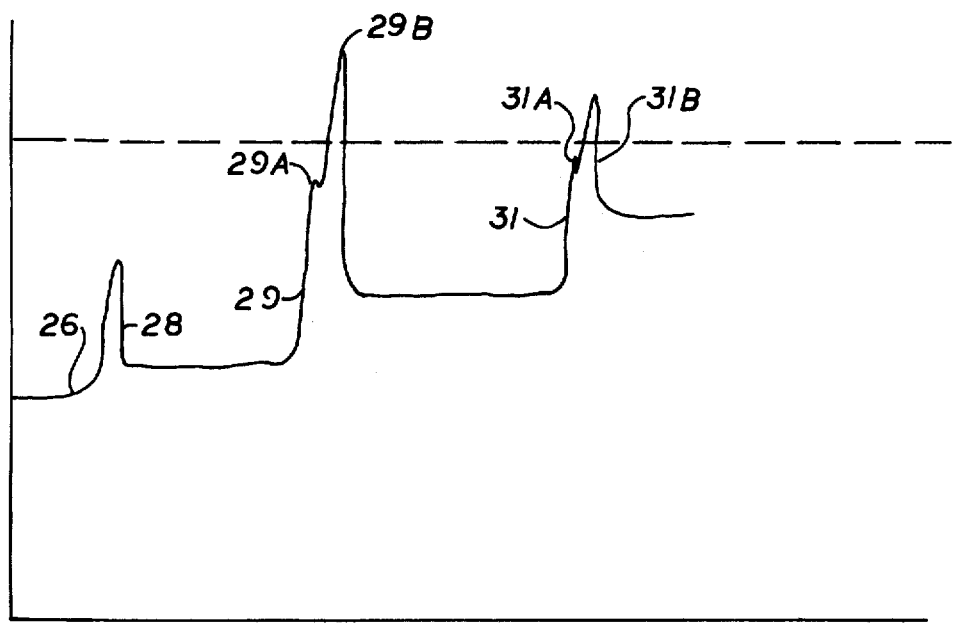
FIG. 2 is an illustration of a typical power consumption chart without the use of the device shown in FIG. 1.

Referring now to FIG. 2 which illustated operation without the use of the method within the scope of the present invention as shown by curve 26, normal power consumption is provided until a peak 28 occurs, illustrating an increased power consumption during the occurance of an initiation of one load. Peak 29 is an illustration of power consumption during the initiation of two loads 29A and 29B while 31 is an illustration of the power consumption at the nearly simultaneous initiation of two additional loads 31A-31B. It will be further noted that the base consumption of power rises between each peak.

Typically, a maximum nonpenalty peak load as illustrated by line 32 is provided by contract with an electrical utility where the power consumption in excess of the maximum is at a penalizing rate.

Figure 3:
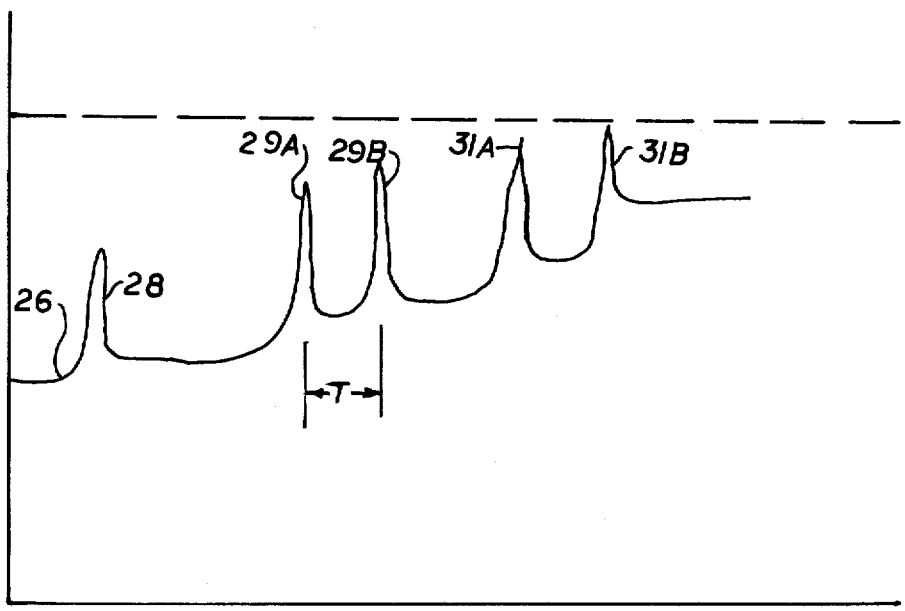
FIG. 3 is a simulated power consumption chart of a facility utilizing a device within the scope of the present invention as shown in FIG. 1.

FIG. 3 is an illustration of the operation of the series of devices utilizing a device and method within the scope of the present invention where a normal power consumption curve 36 is shown and where 4 peaks 29A, 29B, 31A and 31B are shown representing the 4 peak loads illustrated in FIG. 3 where none of the peak loads crosses the maximum or penalizing level of power consumption. It will be noted that in the illustration of FIG. 3 the power consumption rate is allowed to drop to the new base rate before initiation of each new load by the time interval provided by controller 10 so that the peaks are separated by a minimum time interval T.

While the objectives of the present invention can be accomplished by the use of the various electrical and electro-mechanical assemblies, the present example of the invention is illustated by use of a controller computer for example a Dynabyte (TM) 280 Based self contained programmable control computer with memory and on board flag outputs, sense inputs and input/output ports.

As shown in FIG. 4 the computer, controller 9 in FIG. 1, includes an 8 bit microprocessor 31 programmed by means of a keyboard 32 through a terminal interface 33 and address buss 34 to microprocessor 31. Buss 34 also addresses a read only memory (ROM) controller 36 for program storage and a RAM memory unit 37 used for various purposes including timetable storage. An input/output interface 38 is also provided to be addressed by address buss 34 and includes outputs 6A-6P from activators 7A-7P. Input 5 from power interruption detector 2 is supplied to an input of interface 38 to actuate the override control 12 which, in the example shown is provided in a mapped memory of interface 3 which interacts with memory unit 37 and ROM controller 36 as shown by connection 41.

A data buss 42 is provided interconnected between elements 31 and 36-38 with interface 33 to provide information based status and program which can be displayed on cathode ray tube 17.

It will be understood that the foregoing is but one example of a method and apparatus within the scope of the present invention and that various other arrangements within the scope of the present invention will occur to those skilled in the art upon reading the foregoing description.

The invention claimed is:

1. Apparatus for minimizing peak load usage in selected electrical system having multiple electrical power loads where each load is provided electrical power source means by means of load power supply circuit means, including: first switch means disposed in selected load power supply circuit means, first switch operator means to selectively open and close said first switch means; real time clock means to supply real time to control means where the control means is adapted to actuate and deactuate each said first switch operator means at a preselected time to correspondingly open and close first switch means associated with the operator means where the control means prevents simultaneous actuation of more than one first switch operator means within a selected time interval; and power outage detector means to detect power interruption at the electrical power source means; second control means actuated by said control means upon resumption of power after power interruption, where the second control means is adapted to override the first control means in the event of power interruption and at the time of power resumption to sequentially reactivate said first switch means and load means which are to be in active condition at the real time of power resumption and where reactivation of said first switch means which can be activiated at time of power resumption occurs at selected time intervals and in selected sequence, and return control from the second control means to the first control means upon resumption of power to all switch means which are to be activated at time of power resumption; and alternate power supply means actuated by power interruption to supply power to said first and second control means during the period of rush power interruption.

* * * * *